(12) United States Patent
Fabry

(10) Patent No.: US 8,789,309 B2
(45) Date of Patent: Jul. 29, 2014

(54) BEDBUG DETECTION DEVICE AND METHOD

(75) Inventor: Mathew Fabry, Rochester, NY (US)

(73) Assignee: Night Stick Company, LLC, Rochester, NY (US)

( * ) Notice: Subject to any disclaimer, the term of this patent is extended or adjusted under 35 U.S.C. 154(b) by 252 days.

(21) Appl. No.: 13/292,189

(22) Filed: Nov. 9, 2011

(65) Prior Publication Data

US 2012/0110893 A1      May 10, 2012

Related U.S. Application Data

(60) Provisional application No. 61/412,116, filed on Nov. 10, 2010.

(51) Int. Cl.
*A01M 1/10*        (2006.01)

(52) U.S. Cl.
USPC .................................. 43/123; 43/114; 43/121

(58) Field of Classification Search
CPC ......... A01M 1/103; A01M 1/14; A01M 1/18; A01M 1/24
USPC ............ 43/107, 109, 114, 121, 123, 136, 108
See application file for complete search history.

(56) References Cited

U.S. PATENT DOCUMENTS

| | | | | |
|---|---|---|---|---|
| 246,771 A | * | 9/1881 | Hey | 43/123 |
| 919,827 A | * | 4/1909 | Cochrane et al. | 43/144 |
| 1,166,103 A | * | 12/1915 | Williams | 43/107 |
| 1,641,127 A | * | 8/1927 | Denslow | 43/109 |
| 2,086,046 A | * | 7/1937 | Preston | 43/124 |
| 2,092,659 A | * | 9/1937 | Stone | 52/101 |
| 2,153,713 A | * | 4/1939 | Eiane | 43/107 |
| 4,048,747 A | | 9/1977 | Shanahan et al. | |
| 4,577,434 A | * | 3/1986 | Davis | 43/115 |
| 4,709,504 A | | 12/1987 | Andric | |
| 5,119,586 A | * | 6/1992 | Townsend | 43/114 |
| 5,454,186 A | | 10/1995 | Gang | |
| 5,713,153 A | * | 2/1998 | Cook et al. | 43/114 |
| 5,896,695 A | * | 4/1999 | Walker | 43/107 |
| 5,950,355 A | * | 9/1999 | Gilbert | 43/113 |

(Continued)

OTHER PUBLICATIONS

BB Alert Active Bedbug Monitor; Installation and usage of the bb alert active bed bug monitor; MidMos Solutions LTD, a subsidiary of Brandenburg UK Ltd; 8 page brochure; No date available.

(Continued)

*Primary Examiner* — Kimberly Berona
*Assistant Examiner* — Morgan T Barlow
(74) *Attorney, Agent, or Firm* — Duane C. Basch; Basch & Nickerson LLP

(57) ABSTRACT

A detection device and method for monitoring the presence of crawling insects, such as bedbugs is provided. One embodiment of the device includes a strip of material, having opposed front and rear surfaces and a plurality of apertures extending through the material, and an adhesive strip applied to the rear surface of the longitudinal strip, thereby exposing the adhesive through the apertures in the longitudinal strip.

15 Claims, 15 Drawing Sheets

(56) References Cited

U.S. PATENT DOCUMENTS

| | | | |
|---|---|---|---|
| 6,343,434 B1* | 2/2002 | Petti | 43/131 |
| 6,370,812 B1* | 4/2002 | Burns et al. | 43/124 |
| 6,691,454 B1* | 2/2004 | Conroy | 43/132.1 |
| 6,718,687 B2* | 4/2004 | Robison | 43/114 |
| 6,772,556 B1* | 8/2004 | Liu | 43/107 |
| 6,786,016 B1* | 9/2004 | Wood | 52/290 |
| 7,165,353 B2 | 1/2007 | Matts et al. | |
| 7,430,830 B1* | 10/2008 | Rosa | 43/137 |
| 7,676,985 B1 | 3/2010 | Perkins | |
| 2010/0212213 A1 | 8/2010 | Hope et al. | |
| 2013/0145679 A1* | 6/2013 | Nenninger | 43/114 |

OTHER PUBLICATIONS

BB Alert Passive Bedbug Monitor; Installation and usage of the bb alert passive bed bug monitor; MidMos Solutions LTD, a subsidiary of Brandenburg UK Ltd; 10 page brochure; No date available.

The Nighwatch Bedbug Monitor; Apr. 2009, Rev.1; Biosensory, Inc., 107 Providence Street, Putnam, CT 06260; 15 pages (pp. 1-13 +Cover and TOC.

Stern Environmental; sternenvironmental.com/products; 7 webpages downloaded Sep. 22, 2010.

Catchmaster Brand Adhesive Devices-Bedbug Detection System; AP&G Co. Inc., 170 53rd Street, Brooklyn, NY 11232; EPA Material Safety Data Sheet (MSDS); May 1, 2010.

* cited by examiner

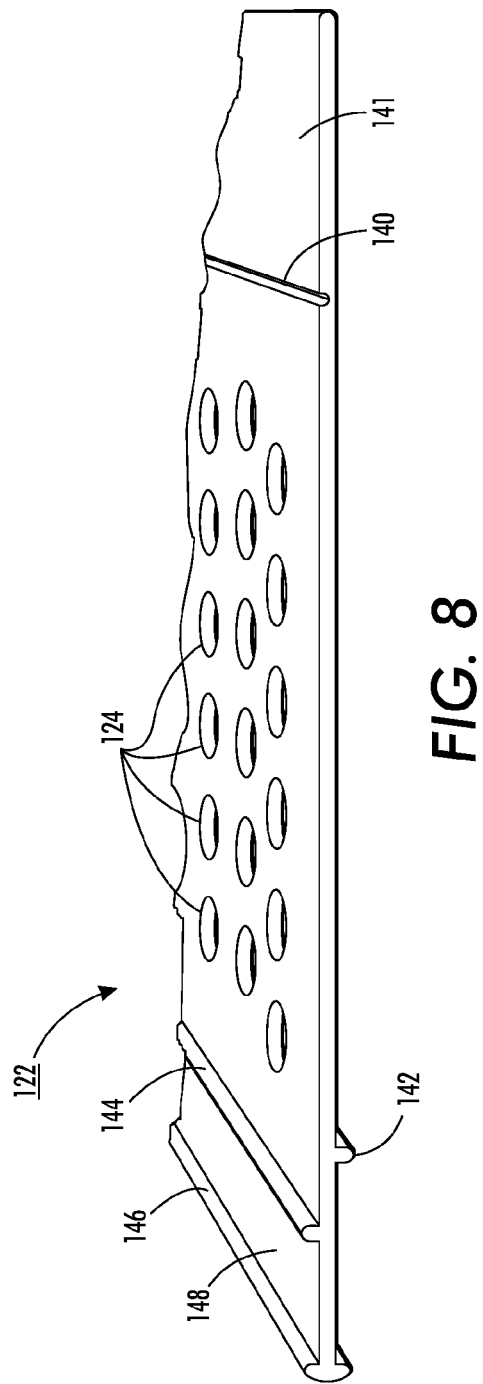

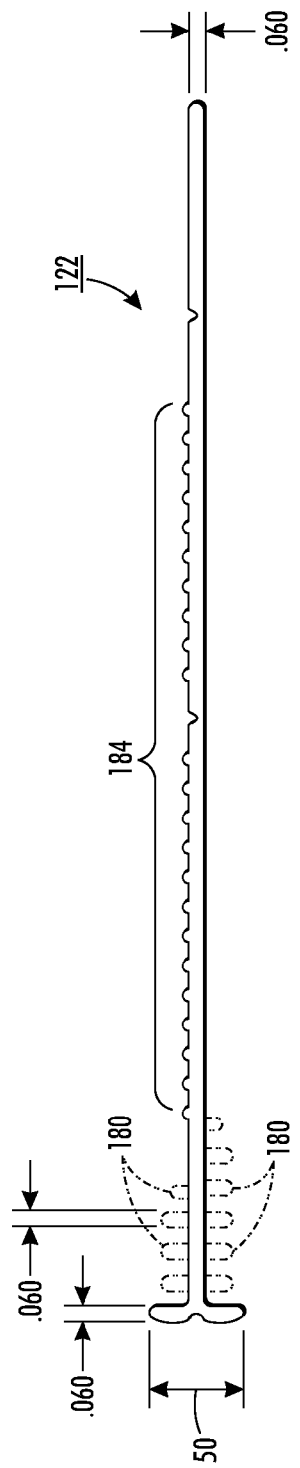

BEDBUG DETECTION DEVICE AND METHOD

This application claims priority from U.S. Provisional Patent Application No. 61/412,116, for a BEDBUG DETECTION DEVICE AND METHOD, filed Nov. 10, 2010 by M. Fabry, which is hereby incorporated by reference in its entirety.

The disclosed systems and methods are directed to a real-time passive means for detecting, intercepting and monitoring of the presence of bedbugs and further creating a visual record thereof. More particularly, the disclosed embodiments are directed to a bedbug detection strip or device that indicates the presence, extent or location of a bedbug or similar crawling insect infestation.

BACKGROUND AND SUMMARY

After World War II, the compound DDT largely annihilated bedbugs in the United States of America and many Western countries, although bedbugs continued to flourish in other countries. The banning of DDT coupled with the growth of international travel resulted in a resurgence of bedbugs and they are now commonly found throughout the United States. Typically, bedbugs feed on humans, and when not doing so they hide in tiny crevices in or near beds or other locations which humans frequent.

The "hitch-hiking" bedbug has become a perpetual concern, in some cases even a nightmare for the hospitality industry. Almost every country in the world is now dealing with bedbugs. The bedbug can be easily transported from one location or country to another by a human host or even in personal belongings such as luggage. Thus, while pest inspections can declare a room to be clear today, the bedbug can transplant itself tomorrow and the hotel or other facility is open to yet another complaint, loss of revenue and undesirable publicity. There was a 300% increase in complaints in 2010 alone. The detection devices described herein (including the Night Stick™ manufactured and sold by Deverex, Inc.) drastically cut the number of outbreaks within a year by detecting, and in many cases capturing, the transplanted bedbugs.

To date, efforts to combat bedbugs have focused on reactive measures aimed at treating the problem, however in the hotel/hospitality industry proactive measures are becoming vital for the protection of goodwill and reputation. Bedbug detection devices have the potential to alert hotel staff, managers and professional exterminators to the presence of bedbugs in the very early stages of an infestation, while they are still confined to a single room or suite. Furthermore, without a reliable means for verification, accusations of bedbugs by a disgruntled guest can instantly damage a reputation and compromise future reservations for a hotel or other lodging facility. Therefore, the hospitality industry must be proactive in detecting and recording bedbug activity and not merely react to a guest's complaint.

In the extermination industry various methods and technologies have been employed to remediate bedbug infestations. However, the prominent fault of existing eradication methods for bedbugs has been in the lack of any systematic means to detect the presence of even a single bedbug or to monitor infestation levels and areas of infestation prior to, during, and after treatment. Bedbugs are frequently found in dwellings in the hospitality industry due to a high rate of occupant turnover which leads to frequent opportunities to transplant a bedbug into an uninfested location, whereby each and every new guest has the potential of being bitten or even bringing bedbugs into their luggage or clothes. Without an acute awareness and an intervention plan, a single bedbug brought in by a guest can create a colony within weeks as one female can lay up to 500 eggs, each of which are no larger than a spec of dust.

Conventionally, a large tacky material or surface is associated with an attractant such as heat, carbon dioxide ($CO_2$), methanol, octenol, glycerin kairomone or others to artificially lure a bedbug onto the tacky material and immobilize the bug. While this method has proven to be relatively effective it suffers from several limitations. It is a common belief that the most effective lure is an actual human. Therefore, synthetic attractants are not clearly effective. Also, it should be noted that the production of sufficient and sustained heat and/or $CO_2$ as an attractant in a hotel room presents a significant logistical challenge where a large number of suites are involved. Additionally, the use of aromatic agents as attractants in hotel rooms exposes the guests to the scent, as well as possible exposure, or even ingestion of the chemical by a juvenile. In regard to the exposed and unprotected tacky material, over a short time, it attracts and acquires dirt and lint particles that significantly reduce the surface tenacity and retention capabilities. Furthermore, non-curing adhesives and attractants require frequent renewal as they vaporize.

Notoriously difficult to locate, bedbugs hide or take "harbor" in tiny cracks and crevices on and near beds and similar sleeping areas in order to be near their food supply. When in need of sustenance they venture out from their harbor at night or in the dark to seek out a human. In doing so they travel along bed posts and rails adjacent sleeping surfaces such as mattresses, box springs and the like in search of the source of human body heat and expelled carbon dioxide that serves as a road map to their prey. Conventional wisdom suggests that in order to catch and kill a bedbug one only needs to lure them into a sticky trapping device by means of an attractant. However, in some cases this may prove to be counterproductive. For example, in a situation where previously there were no bugs, an attractant, may even provoke a transient bedbug, harbored within the luggage of a guest, to seek out the attractant and adopt the hotel room or dwelling as its new residence. Furthermore, traps using attractants may have a tendency to draw in bedbugs from surrounding areas, thus expanding their area of infestation. One embodiment of the devices disclosed herein teaches the use of attractants when bedbugs are known to be present, and may not necessarily support their use when proactively monitoring or detecting an introduction of bedbugs.

Recognizing the potential problem with the use of conventional bug traps having an attractant, the disclosed embodiments provide a means to detect and thereby create a visual "record" of the presence of bedbugs without necessarily using an artificial luring agent that has a tendency to disrupt their customary routine. The various embodiments described herein provide a detection device that is intended to be routinely inspected or observed by housekeeping or other staff in the hospitality trade in order to enable the early detection of the presence and movement of bedbugs.

The disclosed embodiments further enable the reliable monitoring of bedbug activity in locations that require little to no overhead, and many of the embodiments are intended to be virtually transparent to the guests. In other words, several embodiments are not apparent to an occupant of the room or area in which they are used, yet are readily accessible to the housekeeping staff in order to be checked or inspected on an ongoing and periodic basis. Although primarily discussed herein as a commercial means to detect the presence of bedbugs in a hotel or similar facility in the hospitality industry (e.g., dormitories, hotels, motels, apartment buildings, cruise ships, conference centers, camps, etc.), it will be appreciated that some or all of the aspects of the disclosed embodiments may be employed within a household, in other commercial or retail businesses (e.g., apparel and footwear stores) and other locations as well. Accordingly, it is one object of the disclosed embodiments to reliably detect the presence of bedbugs.

Disclosed in embodiments herein is a detection device, comprising: a longitudinal strip of material, having opposed front and rear surfaces and a plurality of apertures extending through the material and the front and rear surfaces; and an elongated adhesive strip having front and rear faces, where the front face of said adhesive strip includes a coating of non-drying adhesive; said adhesive strip attached to and generally spanning the length of the rear surface of the longitudinal strip, thereby exposing said adhesive through the apertures in the longitudinal strip. In one embodiment the detection device may be deployed along the perimeter of a bed, for example, along the sides or rails of a support for a box spring mattress.

Also disclosed herein is a method for detecting the presence of bedbugs, including: placing a bedbug detection device along at least part of a periphery of a sleeping surface; and regularly inspecting the detection device for the presence of at least one indicator selected from the group consisting of: bedbugs, bedbug eggs, bedbug fecal matter, bedbug skin and bedbug shells.

BRIEF DESCRIPTION OF THE DRAWINGS

FIG. 8 is a partial side view of the exemplary detection device along FIG. 12B-FIG. 12B from FIG. 7;

FIGS. 11-12 are additional engineering illustrations of aspects and features of alternative embodiments for the disclosed detecting devices.

The various embodiments described herein are not intended to limit the disclosure to those embodiments described. On the contrary, the intent is to cover all alternatives, modifications, and equivalents as may be included within the spirit and scope of the various embodiments and equivalents thereof.

The embodiments described herein are not intended to limit the systems or methods to those embodiments described. On the contrary, the intent is to cover all alternatives, modifications and equivalents as may be included within the spirit and scope of the disclosure and the devices and methods set forth therein.

DETAILED DESCRIPTION

Figure 1:
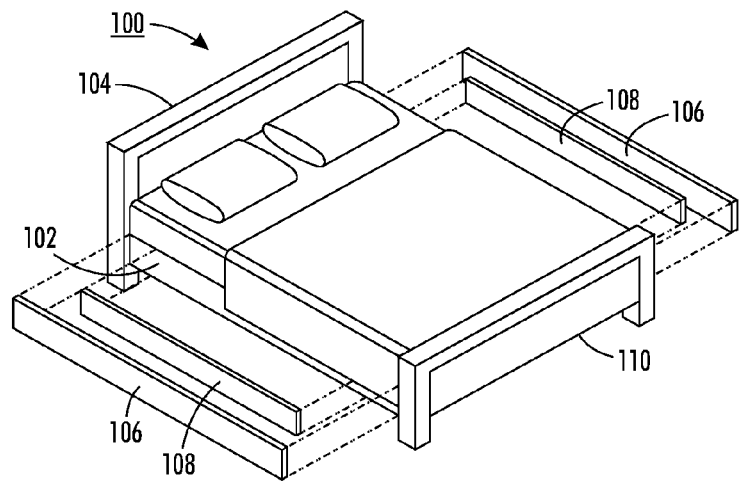
FIG. 1 is an exploded perspective view of a bed including one embodiment of an insect (e.g., bedbug) detection device.
Figure 2:
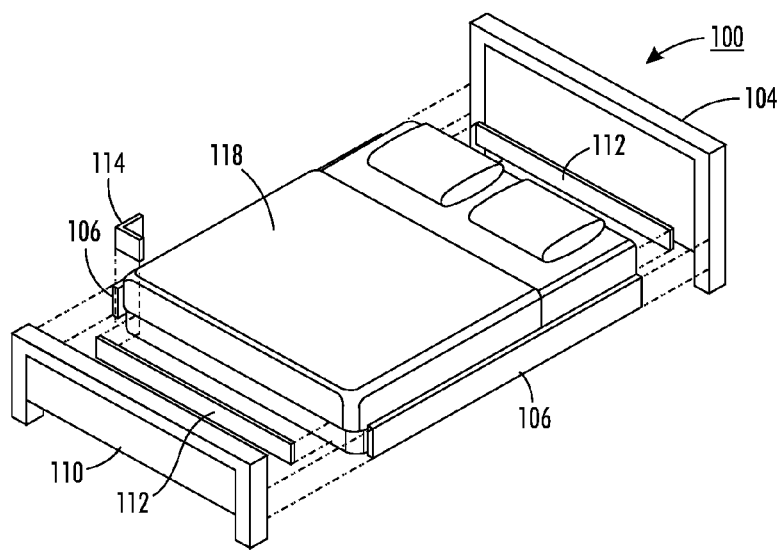
FIG. 2 is an exploded perspective view of a bed having detection devices installed at the head/foot board.

For a general understanding, reference is made to the drawings. In the drawings, like references have been used throughout to designate identical or similar elements. It is also noted that the drawings may not have been drawn to scale and that certain regions may have been purposely drawn disproportionately so that the features and concepts depicted therein could be properly illustrated Turning first to FIGS. 1 and 2, shown therein are exploded perspective views of a conventional sleeping surface or bed 100. Bed 100 has a box spring 102 and mattress 118 supported between head board 104 and foot board 110, on bed rails 106, and the rails interconnect the head board 104 and foot board 110. Recognizing that bedbugs are most likely to be attracted to the bed where human victims are found, a bedbug detection device 108 is strategically positioned along or around the periphery of the box spring 102, for example captured along the sides between the box spring 102 and side rail 106. Placement of the detection devices along at least a portion of the periphery of the box spring 102, as shown, creates a barrier for the purpose of intercepting and detecting the presence of a roaming bedbug(s). The head and foot regions may be monitored in a similar manner whereby detector device 112 is inserted between box spring 102 and the head board 104 or footboard 110. Additionally, corner guards or traps 114, constructed in a similar manner as detector 112, may be used. The corner detectors are, however, bent or folded around the corner to conform to the corners of the box spring 102 and/or mattress 118. As illustrated in the steps of FIGS. 9A-9F, for example, the corner trap may slide between an existing corner guard and the box spring fabric.

Once installed a guest resting on mattress 118 has essentially been separated or isolated from the rest of the room by the detector. It should be noted that the likelihood of retaining a bedbug is based on two principles, (i) location and (ii) accessible surface area. In regard to location, having placed detection devices along or entirely about the periphery of the bed or sleeping area of the human guest ensures a high probability that the presence of the bedbug will be detected in one of several ways, including entrapment of the bedbug itself, the bedbugs eggs or the bedbugs waste (feces and/or shell shedding. Thus, the detection device, while preferably capturing the bedbug so as to immobilize it on an adhesive surface, is not limited to detection solely in this manner. Secondly, unlike other traps, the disclosed embodiments provide for at least about a square foot of trapping surface area positioned within a region where bedbugs are most likely to traverse.

Figure 3:
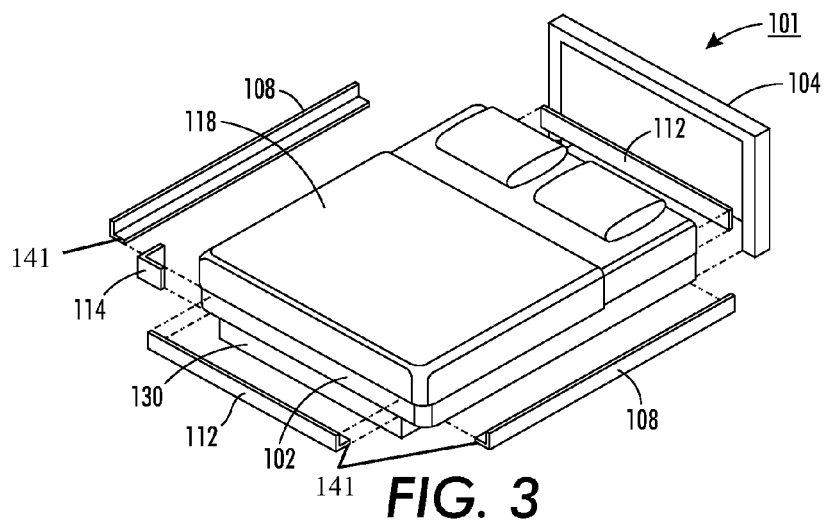
FIG. 3 is an alternative perspective view of detection devices installed on a bed having the mattress on a pedestal as is often the case in hotels and motels.

Turning to FIG. 3, a similar sleeping arrangement is shown for a bed 101, wherein the box spring and/or mattress are supported on a pedestal 130 in a manner that may be more characteristic of a hotel setting. Bedbug detectors 108 and 112 are now positioned between the floor and the bottom portion of pedestal 130, to provide substantially the same functionality as previously discussed. In this configuration a folded region 141 of the detectors may be inserted between the carpet and pedestal 130 so that the detectors are readily accessible, but out of view.

Figure 4:
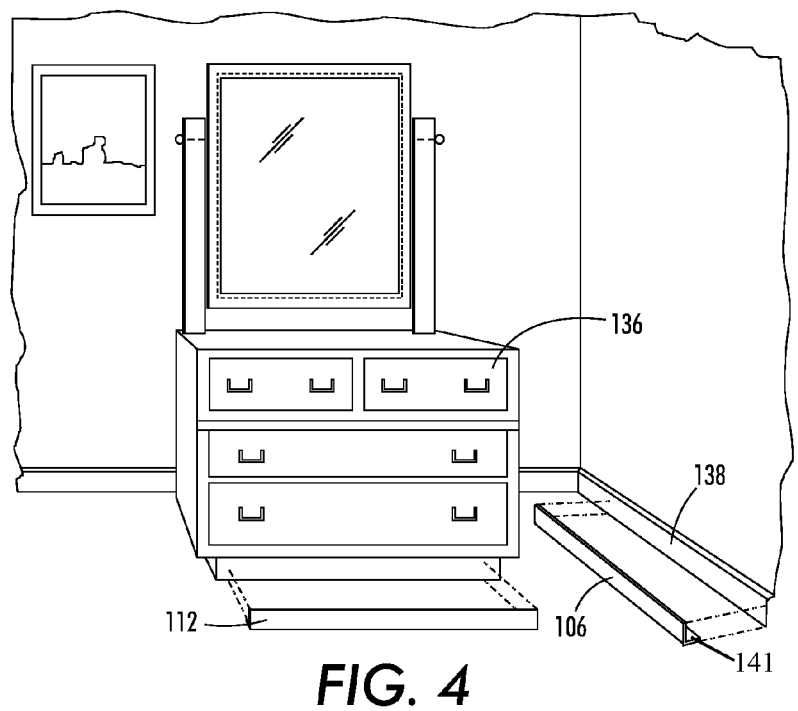
FIG. 4 is a perspective view of a corner of a room having a base board and associated furniture where detection devices are installed.

An alternative installation for detector 106, as depicted in FIG. 4, is along the periphery of a room, as part of a baseboard configuration, and within or along the base of furniture 136. In addition to the illustrated embodiments of FIG. 4, the detectors may be installed in the rear of dressers (e.g., behind drawers), in closets, etc. Again in an "L"-shaped configuration of the detector, region 141 nestles in between the flooring (e.g., carpet) and base board 138. Additionally, detector 112 may be conveniently positioned along the base or the kickboard of a piece of furniture 136 (e.g., dresser, nightstand, armoire, television cabinet and the like), as well as in a closet. It is further conceivable that the detectors depicted in FIG. 4 may be used in combination with the bed configuration discussed above.

In yet another configuration, the detectors 108 and 112 may be placed along, near or even within the gap between a mattress and box spring as illustrated, for example, in FIGS. 9F-9J. The detector installs easily and discretely in or near the bedbugs' favorite safe harborage sites on every bed. In a kit form (e.g., kit for one bed may include side/end strips and corner traps) the components slip in place between the box spring and corner protectors of a conventional bed with a frame as depicted above. The side strips are designed to be placed in various areas of a bed, adjacent to bedding components such as mattresses, box springs, frames, pedestals, headboards and the like. For rail type beds, a section of the detector is slipped in between the rail and box spring on both sides as illustrated in FIGS. 1-3.

Figure 9A:
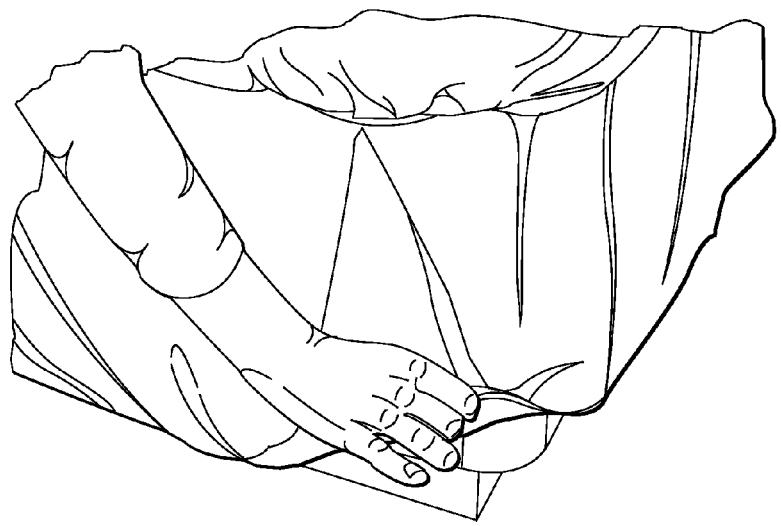
FIGS. 9A-9E are illustrations of steps for the installation of an embodiment of the detection devices.
Figure 9B:
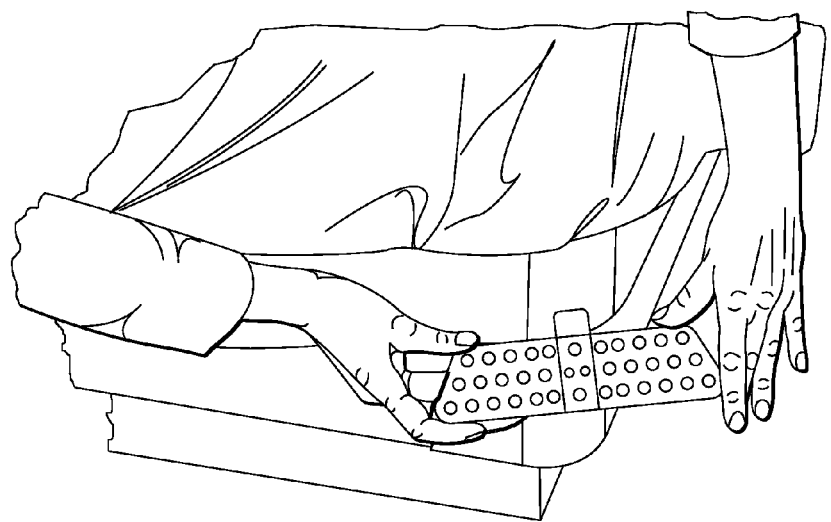
Figure 9C:
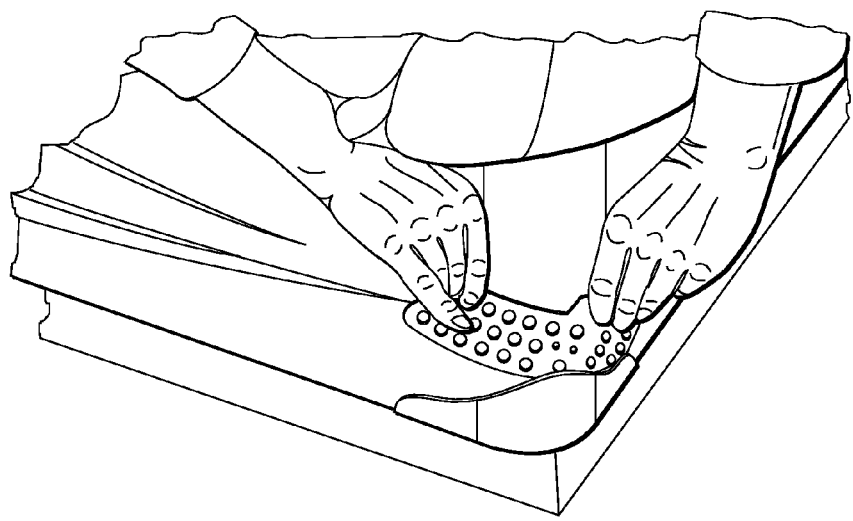
Figure 9D:
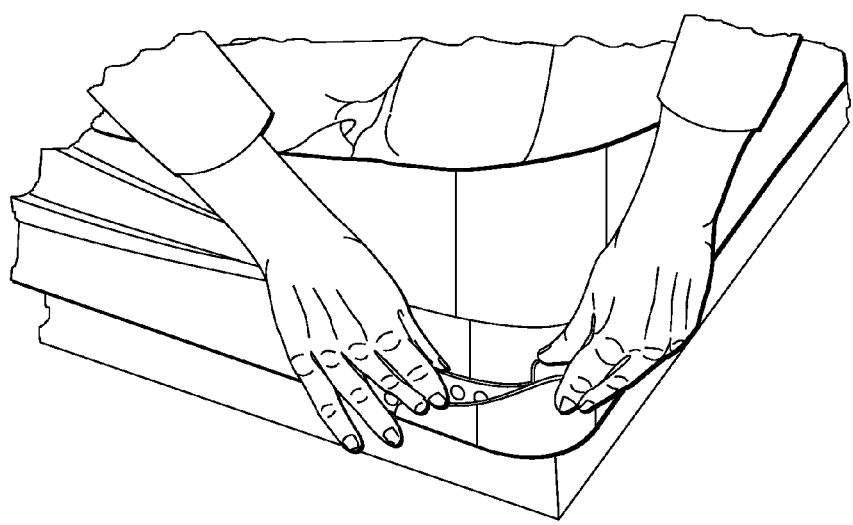
Figure 9E:
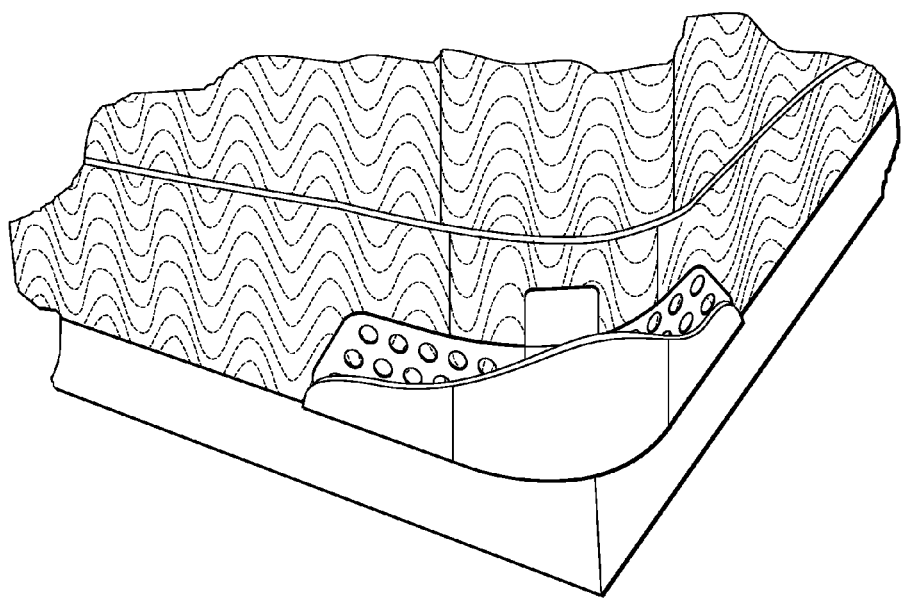
Figure 9F:
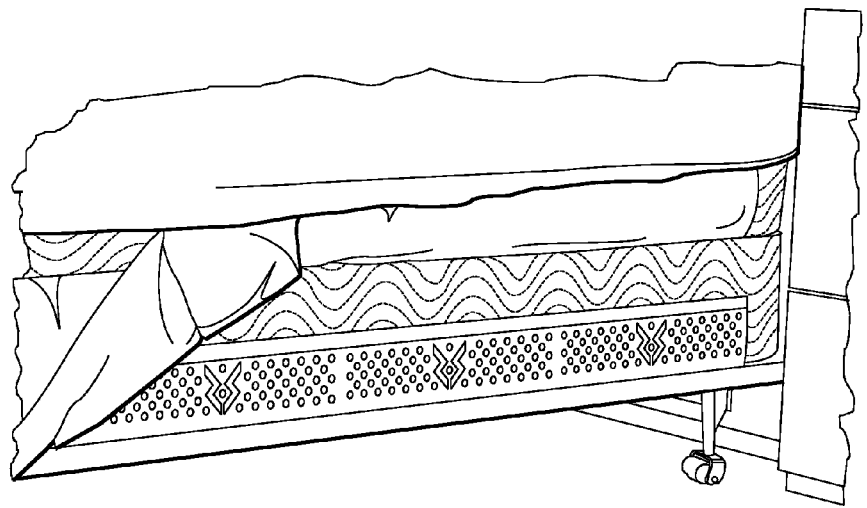
FIGS. 9F-9J are illustrative examples of alternative installations of the detection device.
Figure 9G:
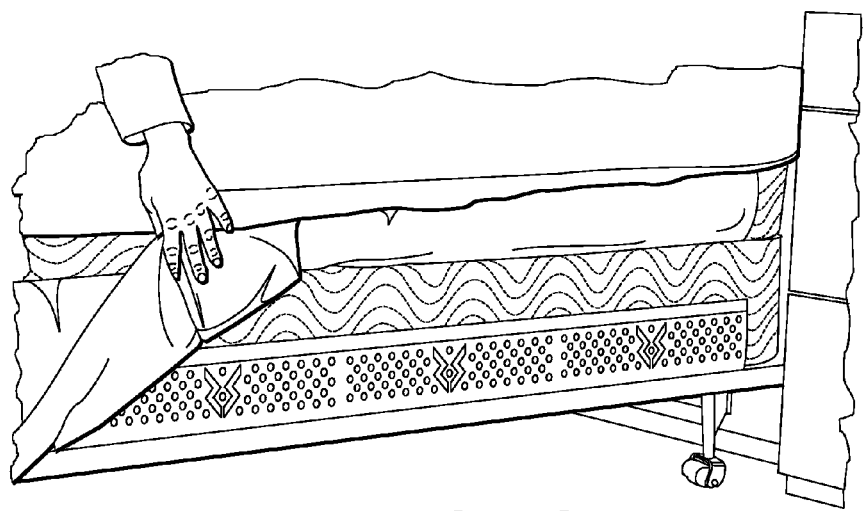
Figure 9H:
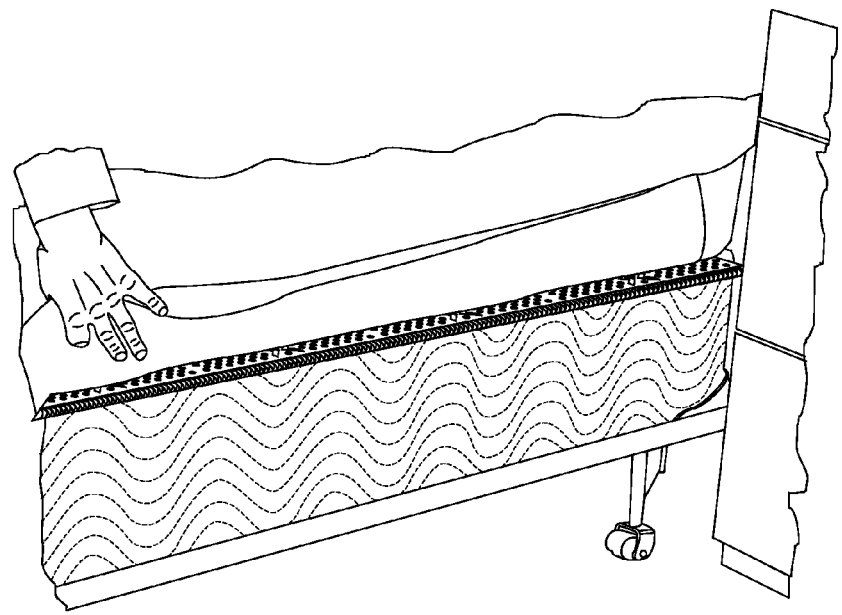
Figure 9I:
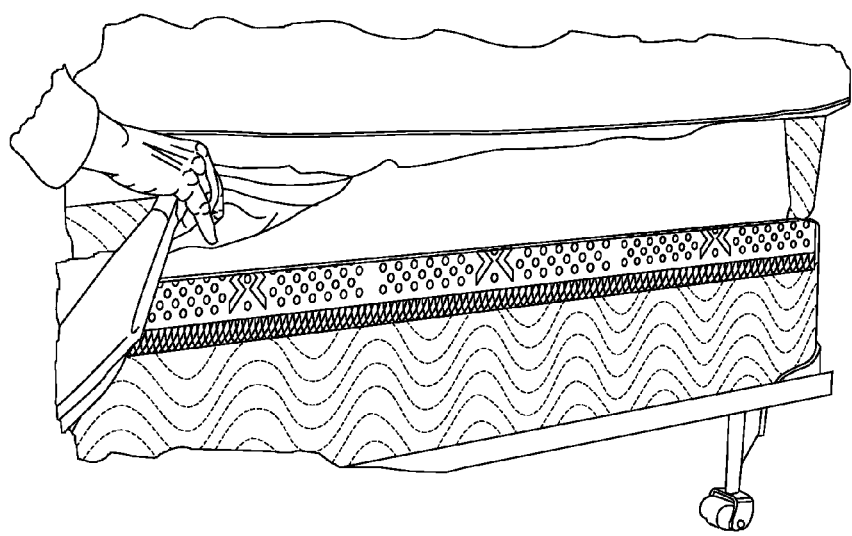
Figure 9J:
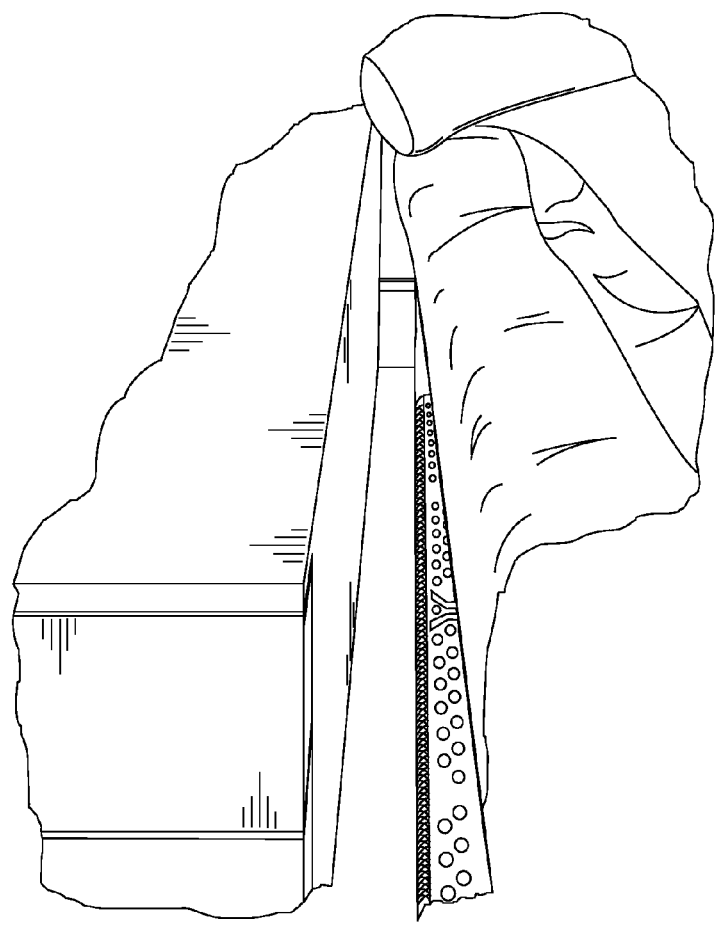

As illustrated in FIGS. 9B-9E, for example, a corner trap may be placed between the box spring and the existing corner guard. In this manner the longitudinal strip of material is curved or bent so as to conform to or around a non-planar surface such as a corner or edge on a box spring or mattress. FIGS. 9A-9E illustrate, sequentially, a method for detecting the presence of bedbugs, by placing a bedbug detection device along at least part of a periphery (e.g., corner) of a sleeping surface or bed, and then regularly inspecting the installed device to observe the presence of an indicator such as bedbugs, bedbug eggs, bedbug fecal matter, bedbug skin and bedbug shells. As illustrated in FIGS. 9C-9E, the detection device is placed in an abutting relationship to a bedding component such as a mattress or box spring. For installation at corners, the installation, and re-installation after inspection, process includes bending the bedbug detection device and sliding the bedbug detection device between a box spring and a corner guard.

Figure 10A:
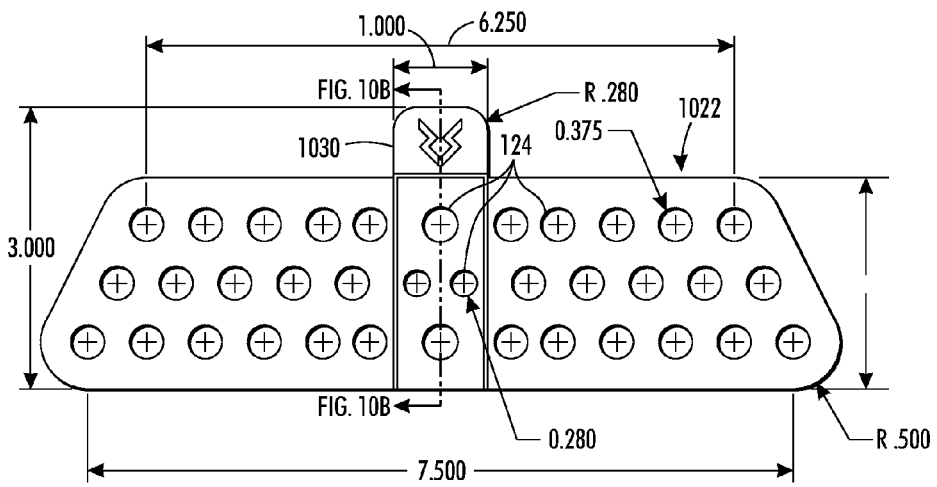
FIGS. 10A-C are engineering drawings of an exemplary corner trap embodiment for the detection device.
Figure 10B:
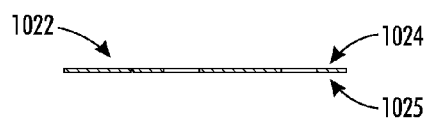
Figure 10C:
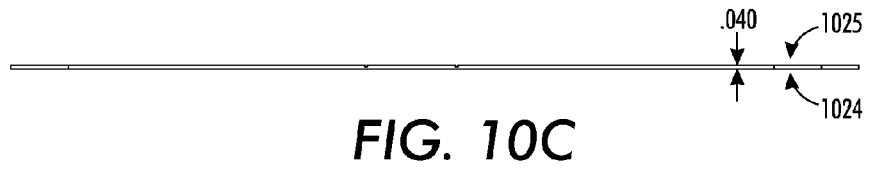

A detailed illustration of an exemplary corner trap is also found in FIGS. 10A-10C. Referring to FIGS. 10A-10C, the corner trap embodiment 1022 includes a somewhat shorter longitudinal strip of material, having opposed front and rear surfaces 1024 and 1025, respectively, along with a plurality of apertures 124 extending through the material to connect the front and rear surfaces. As with the previous embodiments, an elongated adhesive strip (not shown) includes a coating of non-drying adhesive, and is attached to and generally spans the length of the rear surface of the strip 1022, thereby exposing the adhesive through the apertures 124 in the longitudinal strip. As illustrated, a tab 1030 may be attached to facilitate the removal of the strip for inspection(s).

Figure 9K:
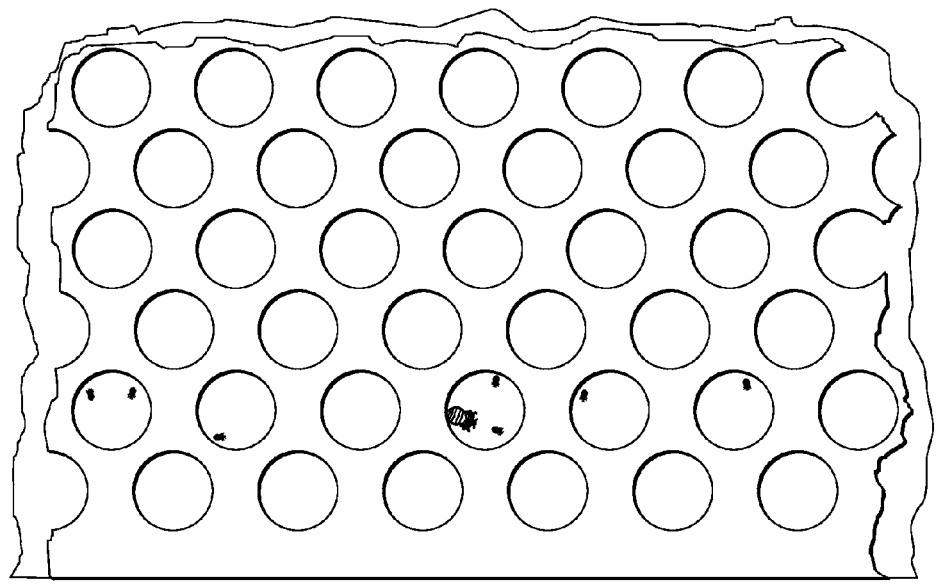
FIGS. 9K-9L are exemplary illustrations of a detector with bugs, feces and eggs present.
Figure 9L:
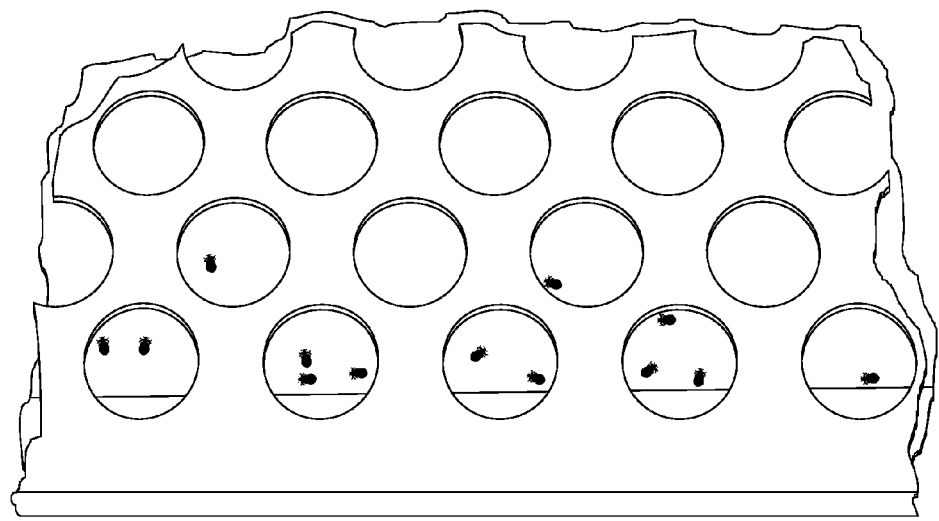

Other types of beds may require the detector to be inserted between the mattress and box spring directly at the head of the bed and both sides (on the underside of the skirting). This prevents any interference when making the bed. Such an installation provides a midway safe harborage that will most likely become the bedbugs' seclusion place of choice. The kit can also be provided with a single detector strip that would be placed at the head of the bed along with the four corner traps. In accordance with these various installation and use configurations the devices are hidden from general view, yet provide a readily accessible location to easily inspect the detector by either removing the detector or lifting the mattress in order to inspect the detector (see e.g., FIGS. 9K-9L for inspection examples). In one embodiment, the detector may also employ an attractant such as glycerin. For example, the detector may include several felt/cloth target points infused with glycerin or other attractant chemicals.

Use of the detectors in one or more of the various configurations disclosed makes it improbable that a bedbug would go undetected. Moreover, the proactive detection of bedbugs not only permits early treatment before an infestation can increase and spread, but it facilitates the rebuttal of allegations of bedbug bites, etc.

Figure 5:
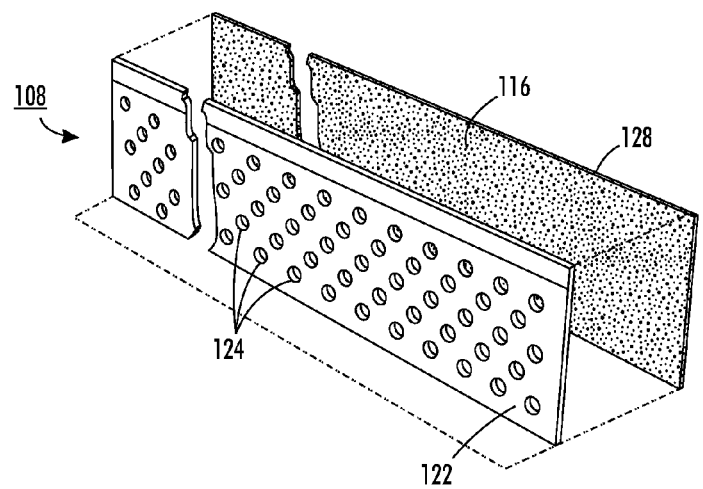
FIG. 5 is an enlarged view of an embodiment of an exemplary detection device disclosed herein.
Figure 6:
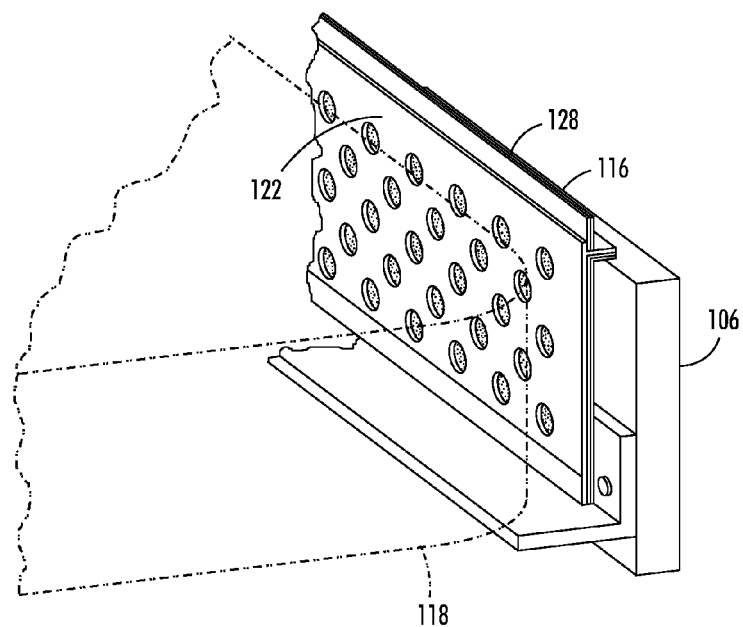
FIG. 6 is an enlarged perspective view of an exemplary detection device installed in a bed in the configuration of FIG. 1.

Having described the manner in which the detectors may be deployed, attention is now turned to the various alternative configurations of the detectors contemplated herein. Referring to FIG. 5, there is shown an assembly view of the components of an exemplary bedbug detector 108 or 112, having essentially three distinct components. A first longitudinal strip 122 is made (e.g., molded, extruded, cut) of a relatively thin pliable material, as further shown in FIG. 7. While various materials may be employed for strip 122, including metals, wood and other organic materials, the use of a plastic strip is contemplated to permit the broadest range of material properties and configurations. Strip 122 can be constructed from a thermosetting material. Various plastic materials may be used, including polyethylene, styrene and ABS, for example KYDEX®, while slightly more expensive than other materials, may provide desirable features such as durability, rigidity and chemical resistance.

The overall length of detectors 108/112 is application specific and therefore can vary greatly, but may be produced in lengths typically up to about five feet. Such a length would permit use in a number of bedding configurations without the need to pre-determine the mattress sizes. In one alternative embodiment discussed above, if a detector 112 is used at the head and foot boards, it may be shorter than detector 108, which is applied along the bed rails. In more general applications it may be advantageous to provide the detection devices in a longer or even a rolled strip having an overall length of between about 10 to 100 feet, for example, wherein specific lengths would be cut to size on site. Apertures 124 are formed (e.g., punched into extruded material strip 122) to produce one or more geometric shapes (e.g., circles, squares, rectangles, stars, etc.) that have straight and curved wall segments as well as corners, that allow bugs to crawl into the aperture or void with the intention of finding a suitable resting or nesting location. Additionally, the radial perimeter of all or some of the apertures 124 may be convoluted, or have perturbations, so as to present an intriguing harbor for the bug to settle in and thereby attract the bug. An additional advantage of strip 122 is to protect the adhesive applied to the rear surface of the strip from contamination and contact with its surroundings The substrate for adhesive strip 128 is constructed from a material sufficiently strong, but yet flexible, to retain tacky adhesive layer 116 thereon. Adhesive strip 128 may also include, on the distal side, a color, pattern or design that visually conforms to the surface to which it is associated. For example, if pedestal 130 has an oak wood finish, adhesive strip 128 could include a printed simulated oak wood grain, likewise base board 138, having been painted the wall color, could have an adhesive strip of the same color. It is noted that strip 122 may be secured in position by any of a number of mechanisms, including a fit between the box spring mattress and the bed frame, or by various fasteners, adhesives and the like. However, it is preferable that the detector 108/112 is relatively easy to remove for inspection and then replaced.

Figure 7:
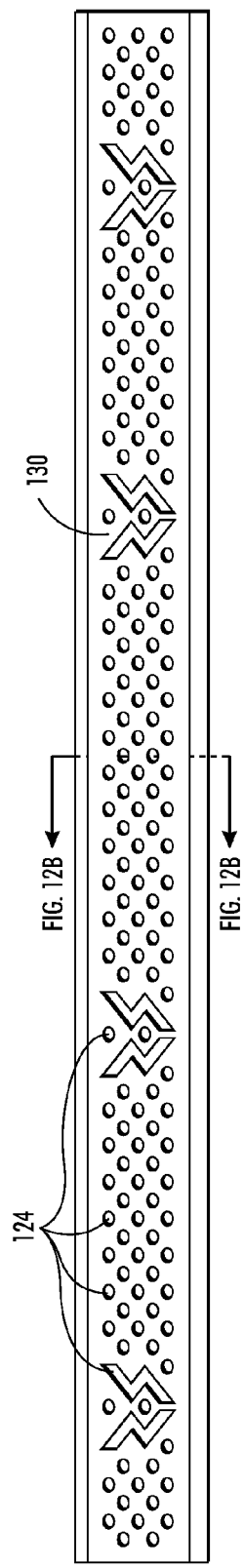
FIG. 7 is a planar front view of an exemplary longitudinal strip of material in accordance with an aspect of the disclosed detection device.

With continuing reference to FIGS. 7 and 8, strip 122 may be made from a number of materials, and preferably include apertures or recesses therein to form a lattice or similar surface to which an adhesive strip is applied to one side. In one embodiment, the strip may include a groove or linear trough 140 whereby the reduction in thickness encourages or enables area 141 of the strip to be folded along the length of the indentation, when required. One surface of the strip may also include other surface irregularities such as grooves or surface features that encourage bedbugs to remain on or along the strip—thereby increasing the likelihood of detection. As another example, a top edge or flange may include protective bristles, dubbed as "snuggle points" to encourage bedbugs to enter into a recess between the strip and the box spring or other surface it abuts. The front surface of the strip, abutting the box spring for example, may also have regions that are grooved surfaces designed as harborage points without glue.

Optional ribs 144 and 142 may be added to not only provide locations where the bedbugs may collect, but may also provide rigidity, as well as fiducials for assembly purposes (e.g., a line along which the adhesive strip 128 may be applied). The partial-ellipse shaped flange 146 provides additional strength as well as assuring a recess when strip 122 is placed against an abutting surface. Also, in the event where an attractant is desirable (i.e. for eradication purposes) it could conceivably be applied within region 148 between flange 146 and rib 144. Additionally, it is further noted that a loosely woven material, suitable for nesting and laying eggs therein, could be adhered along region 148 as well, and/or on flange 146.

In summary the disclosed embodiments generally provide a system and method for bedbug detection and monitoring including a first elongate strip of flexible material having a coating of non-drying adhesive and a second elongate strip of flexible material, affixed to the first, to provide a plurality of openings accessible to the non-drying adhesive. The system and device provides boundary barriers adaptable to the perimeter of a bed and/or room to maximize the opportunity for the interception and detection of the bedbugs.

Referring briefly to FIG. 11, depicted therein is a cross-sectional view of the longitudinal material strip wherein a plurality of small protrusions or "bristles" may be provided on one or both faces of the strip to encourage bedbugs and similar crawling insects to harbor within such regions. While no adhesive material is necessarily present in these regions (although some could be deposited therein), the bristles are believed to promote the bedbug being attracted to the region, and thus the detector itself, dues to the small crevices created by the protrusions 180. Region 184 includes a plurality of grooves or oscillations over the surface of the strip, the grooves are once again believed to serve to attract bedbugs, particularly smaller bedbugs and thus to promote travel across apertures 124 present in the strip. As previously described, as a bedbug attempts to traverse an aperture it comes into contact with an adhesive applied to the rear of the longitudinal strip 122 and is either entrapped by the adhesive or otherwise leaves an indication of its presence in the form of fecal material, a shed shell and/or eggs.

Figure 12A:
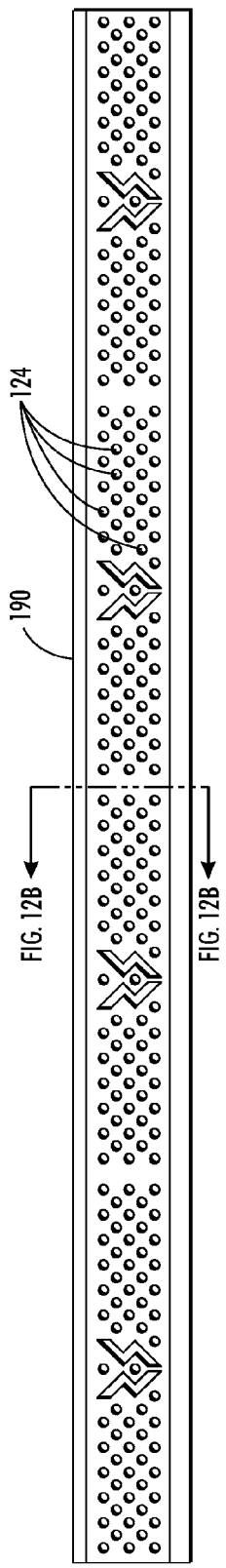
Figure 12B:
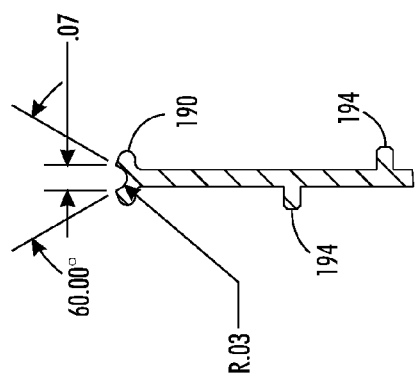

Considering FIGS. 12A-12B, depicted therein are drawings for yet for an alternative configuration of the detection device 122, where the strip is formed as a generally linear, longitudinal material through which a plurality of apertures 124 are created. Once again, application of an adhesive strip to one face of the strip 122 results in the apertures 124 becoming small "traps" into which a bedbug is attracted to harbor. Also included is a top or cap 190 on one edge that provides a penetrable "seal" between the surface of the strip and the adjacent mattress, bedding or similar surface, thereby providing a protected region that is attractive to bedbugs. The additional ridges or protrusions 194 are similarly intended to act as locations against which a bedbug might seek harbor, lay eggs, etc.

While the bedbug detector has been described with reference to several embodiments to monitor for the presence of bedbugs and similar crawling insects, it will be understood that the disclosed embodiments may take various forms or may be accomplished in a variety of ways that will accomplish the described results and are contemplated to be within the scope of the disclosure herein. It will also be appreciated that various above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the disclosure and claims herein.

What is claimed is:

1. A crawling insect detection device, comprising: a longitudinal strip of material, having opposed front and rear surfaces and a plurality of apertures extending through the material and the front and rear surfaces;
   an elongated adhesive strip having front and rear faces, where the front face of said adhesive strip includes a coating of non-drying adhesive,
   said adhesive strip attached to and generally spanning the length of the rear surface of the longitudinal strip, thereby exposing said adhesive through the apertures in the longitudinal strip; and
   a plurality of grooves on at least a portion of the front surface of the longitudinal strip, wherein at least some of said grooves are dimensioned to provide a harborage for the insect to reside.

2. The detection device of claim 1 further including an attractant.

3. The detection device of claim 1 wherein the size of the apertures is sufficient to permit a bedbug to fit within the aperture.

4. The detection device of claim 1 wherein the detection device is in an abutting relationship to a bedding component, and where said longitudinal strip has a thickness adequate to prevent the bedding component from contacting the exposed adhesive.

5. The detection device of claim 1, wherein the longitudinal strip of material is flexible and the device is bent to conform to a non-planar surface.

6. The detection device of claim 1, where the reduction in thickness at each of said grooves enables the strip to be folded along the length of said grooves.

7. The detection device of claim 6 wherein the insect detection device is bent in order to conform, in an abutting relationship, to a bedding component.

8. The detection device of claim 1 wherein said longitudinal strip further comprises organic materials.

9. The detection device according to claim 1, further comprising a tab extending from an edge of said longitudinal strip, where said tab does not include any apertures.

10. A crawling insect detection device, comprising:
    a longitudinal strip of material, having opposed front and rear surfaces and a plurality of apertures extending through the material and the front and rear surfaces;

an elongated adhesive strip associated with said longitudinal strip of material, said adhesive strip includes a coating of non-drying adhesive;

said adhesive strip generally spanning the length of the longitudinal strip and exposing said adhesive only through the apertures in the longitudinal strip, and a plurality of oscillations over at least a portion of the front surface of the longitudinal strip, wherein at least some of said oscillations are dimensioned to provide a harborage for the insect to reside.

11. The detection device of claim 10, further including a plurality of grooves on at least a portion of the front surface of the strip, wherein adjacent grooves result in said plurality of oscillations.

12. The detection device of claim 11, where the reduction in thickness at each of said grooves enables the strip to be folded along the length of said grooves.

13. The detection device of claim 12, wherein the insect detection device is bent in order to conform, in an abutting relationship, to a bedding component.

14. The detection device of claim 10, wherein said longitudinal strip further comprises organic materials.

15. The detection device according to claim 10, further comprising a tab extending from an edge of said longitudinal strip, where said tab does not include any apertures.

* * * * *